(12) United States Patent
Tolhuizen et al.

(10) Patent No.: US 9,961,512 B2
(45) Date of Patent: May 1, 2018

(54) METHOD FOR OPERATING AND COMMISSIONING DEVICES IN A ZIGBEE NETWORK

(75) Inventors: Marinus Gerardus Maria Tolhuizen, Waalre (NL); Bozena Erdmann, Aachen (DE); Robert Cornelis Houtepen, Breda (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 574 days.

(21) Appl. No.: 13/985,164

(22) PCT Filed: Feb. 28, 2012

(86) PCT No.: PCT/IB2012/050914
§ 371 (c)(1),
(2), (4) Date: Sep. 11, 2013

(87) PCT Pub. No.: WO2012/117344
PCT Pub. Date: Sep. 7, 2012

(65) Prior Publication Data
US 2013/0344811 A1 Dec. 26, 2013

(30) Foreign Application Priority Data
Feb. 28, 2011 (EP) .................................. 11305212

(51) Int. Cl.
*H04B 7/00* (2006.01)
*H04W 4/08* (2009.01)
(Continued)

(52) U.S. Cl.
CPC ........... *H04W 4/08* (2013.01); *H04L 12/2818* (2013.01); *H04L 12/4625* (2013.01);
(Continued)

(58) Field of Classification Search
CPC . H04L 12/2818; H04L 12/4625; H04L 12/66; H04W 4/008; H04W 4/08; H05B 37/0272; G05B 19/4185
See application file for complete search history.

(56) References Cited

U.S. PATENT DOCUMENTS

| | | | |
|---|---|---|---|
| 2009/0312853 A1* | 12/2009 | Kore | G05B 19/4185 700/90 |
| 2012/0025957 A1* | 2/2012 | Yang | H05B 37/0272 340/12.5 |

OTHER PUBLICATIONS

Dr. Peter Harrop, "ZigBee for Energy Harvesting and Very Low Power", Jun. 7, 2016, Energy Harvesting Journal, pp. 1-4.*
(Continued)

*Primary Examiner* — Xin Jia
(74) *Attorney, Agent, or Firm* — Meenakshy Chakravorty

(57) ABSTRACT

A method for operating devices in a ZigBee network comprising ZigBee Green Power (ZGP)-capable devices and non-ZGP-capable devices, both to be controlled by at least one ZGPD device, is disclosed. In one example, the ZGPD device transmits a ZGPD command frame, and, upon reception of the ZGPD command frame from the ZGPD device, a ZGP-capable device: translates the received ZGPD command to a regular ZigBee command compatible with non-ZGP-capable devices, forwards the translated command, and tunnels the ZGPD command using a ZGP tunneling mechanism, wherein the ZGP-capable devices controlled by the ZGPD device execute only the tunneled command, if the controlled application functionality is supported, and wherein the non-ZGP-capable devices controlled by the ZGPD device execute only the translated command, if the controlled application functionality is supported.

20 Claims, 1 Drawing Sheet

(51) Int. Cl.
  *H04L 12/28* (2006.01)
  *H04L 12/46* (2006.01)
  *H05B 37/02* (2006.01)
  *H04L 12/66* (2006.01)
  *H04W 4/00* (2018.01)
(52) U.S. Cl.
  CPC ............ *H04L 12/66* (2013.01); *H04W 4/008* (2013.01); *H05B 37/0272* (2013.01)

(56) References Cited

OTHER PUBLICATIONS

R Kistler et al; "Tunneling Smart Energy Protocols Over ZigBee", Emerging Technologies & Factory Automatin, EETFA 2009, IEEE Conf. on, IEEE, Sep. 22, 2009, Piscataway, NJ, USA, pp. 1-8, XP031575712.

Yuanxin Jiang et al; "An Improved Rejoin Procedure in Zigbee Networks", Network Infrastructure and Digital Content, 2009. IC-NIDC 2009. IEEE International Conf. on, IEEE, Piscataway, NJ, USA, Nov. 6, 2009, pp. 41-44, XP031585991.

Woo Suk Lee et al., "KNX—ZigBee Gateway for Home Automation," 4th IEEE Conference on Automation Science and Engineering, Aug. 2008 (7 Pages).

"Introducing ZigBee Pro's New Eco-Friendly Green Power Feature," Jan. 2013 (38 Pages).

\* cited by examiner

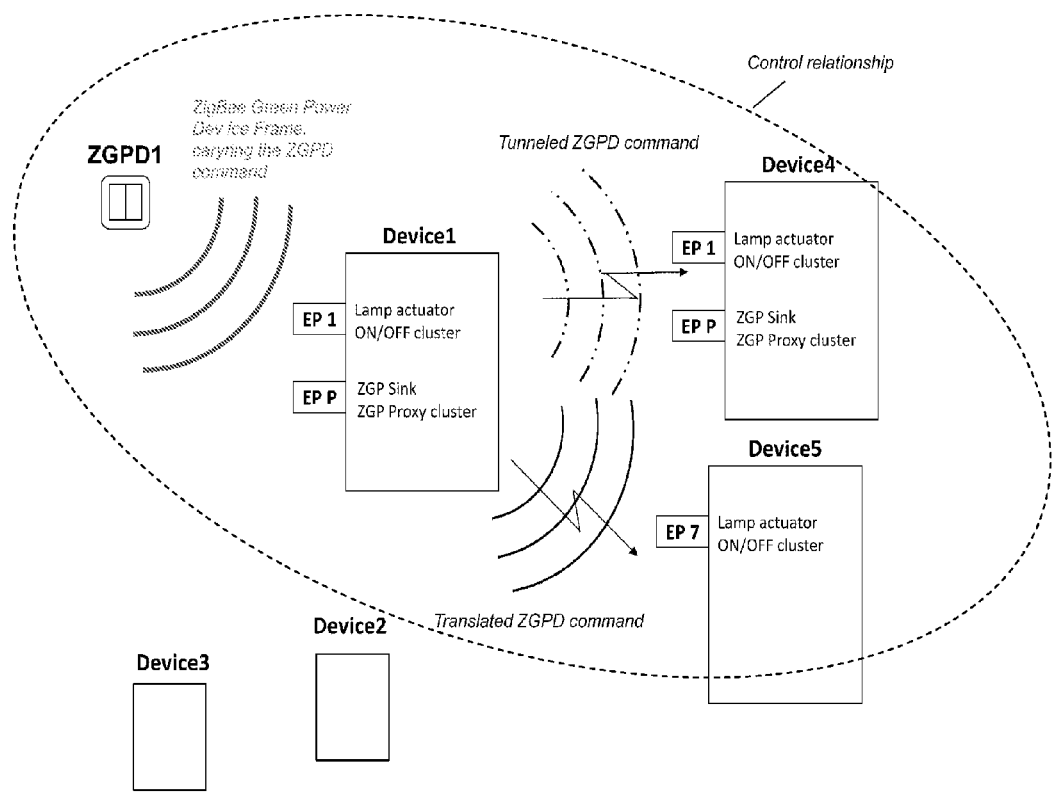

METHOD FOR OPERATING AND COMMISSIONING DEVICES IN A ZIGBEE NETWORK

FIELD OF THE INVENTION

The present invention relates a method for commissioning and operating devices in a ZigBee network comprising ZigBee Green Power (ZGP) capable devices, and non-ZGP-capable devices.

The ZigBee Green Power specification describes message formats and transmission protocols that allow sending control commands from very energy-limited devices, called ZigBee Green Power Devices (ZGPD. A ZGPD is, for example a self-powering device, like an energy-harvesting switch, getting the energy from the user action of operating the switch rocker.

The new message formats described in this ZGP specification, as compared with the ZigBee standard, are required since conventional ZigBee messages are too bulky to be sent with the limited energy that is available at a ZGPD. Moreover, a ZGPD does not necessarily have reception capabilities, and thus the conventional ZigBee protocol exchanges (e.g. for joining, parent re-discovery, binding creation) cannot be applied; accordingly, the ZGP specification needs to describe new commissioning/configuration procedures for ZGPD.

BACKGROUND OF THE INVENTION

Current ZigBee products cannot handle ZGP commands. As a consequence, a user with an installed base of e.g. ZigBee lamps cannot extend it with some ZGP-capable ZigBee lamps and then control any subset of the whole resulting system with e.g. a ZGPD energy-harvesting switch.

Adding a single dedicated "ZGP gateway" device, translating ZGP commands into legacy commands is cumbersome for the user and not reliable (as it creates single-point-of-failure.

Thus, there is a need to provide a method for performing ZGP pairing and configuration for a set of devices to be controlled by ZGPD, the set containing both ZGP-capable ZigBee devices and "legacy" ZigBee devices that do not understand ZGP commands in a robust, user-friendly way.

It is the object of the present invention to provide such a method. Another object of the invention is to provide a method for operating such a mixed system after configuration, such that no duplicate command execution or other unexpected control behaviour occurs.

SUMMARY OF THE INVENTION

The present invention relates to a method for operating devices in a ZigBee network comprising ZigBee Green Power (ZGP)-capable devices and non-ZGP-capable devices, both under control of at least one ZGPD device, the method comprising the following steps:
the ZGPD device transmitting ZGPD command frame,
upon reception of a ZGPD command frame from said/the ZGPD device, a ZGP-capable device:
  translating the received ZGPD command to a regular ZigBee command compatible with non-ZGP-capable devices, and forwarding the translated command, and
  tunneling the ZGPD command using ZGP tunneling mechanism, the ZGP-capable devices controlled by the ZGPD device executing only the tunneled command, if the controlled application functionality is supported,
the non-ZGP-capable devices controlled by the ZGPD device executing only the translated command, if the controlled application functionality is supported.

In one embodiment, the method comprises an initial commissioning phase comprising the following steps:
  the commissioning device identifying the devices, ZGP-capable or non-ZGP capable, to be controlled by the ZGPD device,
  the commissioning device generating a first ZigBee group ID and instructing all identified devices to become members of first ZGPD group corresponding to the first group ID;
  all identified devices becoming members of first ZGPD group corresponding to the first group ID
  the commissioning device obtaining information about the ZGPD, comprising the ZGPD SrcID.

In one embodiment, the method comprises a pairing step, wherein pairing commands are sent from the commissioning device to the members of the first group.

In one embodiment, all devices under control of the ZGPD device are member of a single ZigBee group, and the translating, forwarding and tunneling a command comprises the steps of:
  upon reception of a ZGPD command frame from said ZGPD device a ZGP-capable device
    translating the ZGPD command into a regular ZigBee command and forwarding the translated command to devices being members of said ZigBee group, and
    tunneling the non-translated ZGPD command to devices being members of the said ZigBee group,
    and wherein the ZGP-capable devices, on reception of the translated ZGPD command sent to the ZigBee group, silently drop the command.

In one embodiment, the method comprises as part of the initial commissioning phase, a step of:
  for any ZGP-capable device being a member of a first ZGPD group, having at least one non-ZGP-capable application endpoint being a member of the ZGPD group, upon reception of the pairing commands, of
  adding its ZGP endpoint to the first ZGPD group,
  creating a ZGP Sink Table entry for the SrcID,
  storing the numbers identifying the non-ZGP endpoints being a member of the first ZGPD group in its ZGP Command Translation Table,
  and removing these non-ZGP endpoints from the first ZGPD group.

In one embodiment, each device under control of the ZGPD device is a member of one of two ZGPD groups, the first group consisting of ZGP-capable devices under control of the ZGPD device and the second group consisting of non-ZGP-capable devices under control of the ZGPD device, and the steps of translating, forwarding and tunneling a command comprises the steps of:
  upon reception of a ZGPD command frame from said ZGPD device a ZGP-capable device:
    translating the command and forwarding the translated command to devices members of the second of said two groups, and
    tunneling the non-translated command to devices members of the second of said two groups.

In one embodiment, the method comprises as part of the initial commissioning phase, the step of generating a second ZigBee group ID, and having part of the network devices to be controlled by the ZGPD assigned to the second ZGDP group corresponding to second ZigBee group ID In one embodiment, the network devices assigned to the second ZigBee group are devices, identified by the commissioning device, that are ZGP capable.

In one embodiment, the method comprises, as part of the initial commissioning phase, the steps of, for any ZGP-capable device (with sink capabilities) being a member of the first ZGPD group, having at least one non-ZGP-capable application endpoint being a member of the first ZGPD group, adding its ZGP endpoint to the second ZGPD group, creating a ZGP Sink Table entry for the SrcID, storing the numbers identifying the non-ZGP endpoints being a member of the first ZGPD group in its ZGP Command Translation Table, and removing these non-ZGP endpoints from the first ZGPD group.

In one embodiment, the method comprises the initial step, for a user, of setting the commissioning device in commissioning mode and/or performing the commissioning action on the ZGPD device.

In one embodiment, the method comprises the step of removing any previous group membership of any device in the network related to the ZGPD device.

In one embodiment, the method comprises one of the following steps:

the step of the commissioning device performing an application functionality matching between the ZGPD and the devices to be controlled, the step of the commissioning device sending a command to configure the translation of ZGPD command into regular ZigBee command compatible with non-ZGP-capable devices for translation for non-ZGP-capable devices in the operational phase, and the step, for a ZGP-capable device with ZGP proxy capabilities, of locally storing translation for the ZGPD commands into regular ZigBee command compatible with non-ZGP-capable devices and the information on the group ID to forward it to.

In one embodiment, the forwarding of the translated command uses the ZGP aliasing mechanism.

In one embodiment, the commissioning device role is performed by a device comprised in the group comprising: a dedicated ZigBee Commissioning Tool device, any ZGP-capable device, a regular remote control device, having also ZGP capabilities, ZigBee PAN Coordinator, ZigBee Network Manager, ZigBee Trust Center, application software on a device behind a ZigBee bridge or gateway.

In one embodiment, the step of identifying the devices is performed by using at least one of the following features: graphical grouping of the network devices; ZigBee device and service discovery method, ZigBee identification of devices matching clusters; use of default groups based on predetermined criteria, use of previously established control groups, explicit user action on the selected devices; use of out-of-band method.

BRIEF DESCRIPTION OF THE DRAWINGS

The present invention will now be described in more detail, by way of example, with reference to the accompanying drawings, wherein:

FIG. 1 is a network wherein devices are commissioned and operated by using a method according to the invention.

DETAILED DESCRIPTION OF THE INVENTION

The present invention will now be described in the specific example using ZigBee Smart Light (ZSL) lamps, both ZGP-capable and non-ZGP-capable, controlled by a remote control and for a ZGPD energy harvesting switch, which is capable of sending ZGP Commissioning GPDFs. All the specific addresses, IDs, and other figures are given only on purpose of illustration, and do not restrict the scope of the invention.

Two different embodiments will be herein after detailed:

In the first embodiment, the commissioning procedure is as follows:

Step 0. A user of the network makes sure that all devices he/she wishes to control with the ZGPD switch identified by a ZGPD SrcID, for example 0x12345678, are under control of a remote control (RC) as specified in the Smart-Light specification, and that they form a (ZigBee) group identified by a GroupID, with Group ID equal to, for example 0x0007.

Step 1. The user puts the RC commissioning mode.

Step 2. The user executes the required ZGP commissioning action (as defined in the Green Power specification) or set of actions on the ZGPD, until a commissioning success indication is provided by the system. The commissioning success indication can be an out-of-band signal like a blink or an audible signal on the RC, or a blink of a/some lamps under control of this RC, or any other type of physical parameter perceivable by the user. As part of the ZGP commissioning procedure, the ZGPD switch sends a Green Power Device Frame (GPDF) containing and/or allowing for derivation of information on the ZGPD switch, including, but not limited to the ZGPD's device address (SrcID) and device type (DeviceID).

Step 3. The RC executes the required ZGP commissioning action (as defined in the Green Power specification and provides commissioning success indication when it's finished, (from this time on, the ZGPD switch can be put back in operational mode).

Step 4. Optionally, based on the DeviceID in the GPDF, the RC checks the application functionality matching between the ZGPD and the devices in the to-be-controlled group. The action if this check fails is application dependent (e.g. the RC can provide ZGPD command translation that would compensate for the functionality mismatch, or make this device indicate commissioning error, or indicate overall commissioning error); if the check succeeds, continue with step 5.

Step 5. The RC checks among ZGP-capable devices (using a ZGP Pairing Search command for ZGPD's SrcID) if there was a previous control relationship for this ZGPD switch. If so, the RC stores the values of the commissioned group ID (say 0xMMMM) and the ZGP AssignedAlias (say 0xNNNN).

Step 6A. If there was a previous control relationship, the RC broadcasts a ZGP Pairing Command (with SrcID 0x12345678 and RemoveZGPD subfield=0b1, see [1, Sec. A.3.3.4.2]). On reception of this command, all ZGP devices remove all entries for SrcID 0x12345678 they may have in their proxy tables, and sink tables [1, Sections A.3.4.2.2 and A.3.3.2.2] by. Reception of this command will also make ZGP devices remove translations for SrcID 0x12345678.

Step 6B. If there was a previous control relationship, the RC sends a standard ZigBee ZCL Groups cluster Remove Group command (0xMMMM) in groupcast to group 0xMMMM. ON reception of this command, all devices, ZGP-capable and non-ZGP-capable, remove the membership of any of their endpoints in the old ZGPD switch group 0xMMMM.

Step 7. If there was a previous control relationship, the ZGP AssignedAlias for SrcID 0x12345678 (0xNNNN) will be re-used for proxy aliasing [1, Sec. A.3.6.3.3]. Otherwise, the RC generates from its pool of individual addresses a ZGP AssignedAlias (the next free from its individual address pool, say 0x0004), to be used for proxy aliasing. For convenience, we denote the ZGP AssignedAlias for SrcID 0x12345678 with 0xZZZZ; so 0xZZZZ equals 0xNNNN if there was previous relationship, and equals 0x0004 otherwise.

Step 8. If there was a previous control relationship, the commissioned group ID for SrcID 0x12345678 (0xMMMM) will be re-used for addressing the group to be controlled by the ZGPD switch. If there was no previous control relation, the RC generates from its pool of Group Addresses a new group ID (the next free, say 0x0008) for this purpose. For convenience, we denote the group ID used to address the group to be controlled by 0xVWXY; so 0xVWXY equals 0xMMMM if there was previous relationship, and equals 0x0008 otherwise.

Step 9. The RC sends a standard ZigBee ZCL Groups Cluster Add Group command (0xVWXY) in groupcast to group 0x0007. On reception of this command, all devices, ZGP-capable and non-ZGP-capable, make all their endpoints, ZGP and non-ZGP endpoints, currently being members of the RC group (with group ID 0x0007) to become members of the ZGPD group 0xVXWY.

Step 10. The RC sends a ZGP Configure Pairing command [1, Sec. A.3.3.3.7], containing pairing information, including the DeviceID, the ZGP AssignedAlias (0xZZZZ) and the commissioned group ID (0xVWXY), with Paired endpoints list set to 0xfe (indicating: all current members of this group are to be included in the Paired endpoints list) in broadcast (optionally to the EPP 242, the reserved endpoint for the ZGP Proxy cluster). On reception of this command:
  Legacy devices do not understand this command and hence silently drop it.
  Each ZGP capable device receiving this command
    with proxy capabilities considers storing the ZGPD information for forwarding (according to criteria defined in ZGP specification [1], like InRange, FixedLocation and maintenance policy of the Proxy Table), and if it chooses to do so:
      Creates a Proxy Table entry for SrcID and fills it using the information from the ZGP Configure Pairing command
      Stores the information required for forwarding translated ZGPD commands to legacy devices
        This can have a form of a virtual end point (vEP) with a Command translation table for legacy devices;
        And/or using the Proxy Table, with one of the now reserved sub-fields of the Options field of the Proxy Table entry, for storing LegacyForwarding;
        Alternatively, the Sink Table and/or the Translation Table can be used
      Preferably, the legacy forwarding is explicitly enabled by the commissioning tool.
      This can be realized by having a LegacyForwarding control flag, with 0b0 meaning FALSE and 0b1 meaning TRUE. It could be realized using the now reserved bit 7 of the Options field of the ZGP Configure Pairing command [1, sec. A.3.3.2.2.1].
    Adds itself (EPP) as a member to the ZGP group (0xVWXY) (by issuing APSME-ADD-GROUP.request primitive)
    Checks if it has any ZSL endpoint(s) being member of group 0xVWXY. If yes:
      Creates a sink table entry for SrcID (alias (=0xZZZZ)).
      Creates a ZGPD Command Translation Table entry [1, Sec. A.3.6.2.2] for the local translation for the local ZSL endpoints (SrcID, CommandID→ZSL endpoint, profile, cluster, command/attribute?)
      Stores the numbers of its ZSL end point(s) currently being members of 0xVWXY for internal control;
      Removes its ZSL EndPoint(s) from group 0xVWXY (by issuing APSME-REMOVE-GROUP.request primitive)

Step 11. Optionally: the RC broadcasts Translation Table Update commands [1, Sec. A.3.6.2.2.] to enable command translation for servicing legacy devices. This step is not necessary if these translations are already hard-coded in ZGP-capable devices and/or the default ZGPD command translations can be used.

Step 12. The RC returns to operational mode.

Note that the RC still controls all members of group 0x0007. If group 0x0007 changes at a later time, the set of lamps under control of the RC will differ from the set of lamps under control of the ZGP switch.

In the operational mode, if a ZGP-capable device receives a ZGPD command directly from the ZGP switch, then it performs the following steps:
  Translating the ZGPD command to a ZigBee ZSL command (using the translation table on a virtual EndPoint and/or the Translation Table on the Sink, as created/updated in step 10/11 above), that they then forward to the group 0xVWXY under control of the ZGP switch
  Tunneling the ZGPD command using a ZGP Notification to the ZGP-capable lamps under control of the ZGP switch addressing the group ID 0xVWXY (this is standard ZGP behavior [1], allowing for coverage of the ZGP-capable lamps out of ZGPD range)
  Making a local translation for the non-ZGP endpoints if the device itself is under control of the ZGP switch (this is standard ZGP behavior, allowing for coverage of the ZGP-enabled lamps within ZGPD range).

Moreover, ZGP-capable devices that are a member of group 0xVWXY drop all translated commands that they receive, and only execute ZGP commands, either tunneled, or received directly In forwarding translated commands and tunneling ZGP commands, ZGP-capable devices use the assigned alias 0xZZZZ for proxy aliasing [1, Sec. A.3.6.3.3]. The sequence number used for forwarding translated and tunneled ZGP commands is derived from the value of the GPDF MAC header Sequence Number field. The alias NWK sequence number they use shall be different; the sequence number used for forwarding translated commands equals the value of the GPDF MAC header Sequence Number field—k (modulo 256) for some offset k. An appropriate choice for k is, for example, 24.

The second embodiment comprises common steps with the first one, which will not be detailed again herein after. In this second embodiment, two group IDs are used, instead of a single group in the first one.

Steps 0-4 remain the same. The RC group of the devices to be controlled by the ZGPD switch is denoted with 0x0007.

Step 5, is similar to the one of the first embodiment, except the fact that there may appear to be two control relations, corresponding to the two group IDs.

Step 6A remains the same, while in step 6B, two Remove Groups commands are sent if there were two previous control relations.

Step 7 does not change (We denote the ZGP AssignedAlias for SrcID 0x12345678 with 0xZZZZ, independent of re-used or newly generated), while in Step 8, two group IDs are generated or one re-used and one generated, or two re-used, for example group IDs 0xAAAA and 0xBBBB, independent of re-used or newly generated.

In step 9, all members of group 0x0007 are made member of group 0xAAA.

Step 10 from the first embodiment is replaced by two steps, 10A and 10B. A flag is used in the Configure Pairing command (e.g. using the now-reserved bit in the Options field) so that ZGP-capable devices receiving this command know to act according to step 10A or 10B. The LegacyForwarding control flag as described in the first embodiment can be used for that purpose, set to 0b1 it indicates step 10A, and set to 0b0 it indicates step 10B.

In Step 10A, the RC sends a ZGP Configure Pairing command containing pairing information, including the DeviceID, the ZGP AssignedAlias (0xZZZZ) and the commissioned group ID (0xAAAA), with Paired endpoints list set to 0xfe (indicating: all current members of this group are to be included in the Paired endpoints list) in broadcast (optionally to the EPP 242, the reserved endpoint for the ZGP Proxy cluster).

Legacy devices do not understand this command and hence ignore it.
 Each ZGP capable device receiving this command checks if it has any ZSL endpoint(s) being member of group 0xAAAA, and if so
  Creates a sink table entry for SrcID (alias(=0xZZZZ)),
  Creates a ZGPD Command Translation Table entry [1, Sec. A.3.6.2.2] for the local translation for the local ZSL endpoints
  Stores the numbers identifying its ZSL end point(s) currently being members of 0xAAAA for internal control in its ZGPD Command Translation Table;
  Removes its ZSL EndPoint(s) from group 0xAAAA (by issuing the APSME-REMOVE-GROUP.request primitive)

Next, in step 10B, the RC sends a ZGP Configure Pairing command, containing pairing information, including the DeviceID, the ZGP AssignedAlias (0xZZZZ) and the commissioned group ID (0xBBBB), with Paired endpoints list set to 0xfe (indicating: current members of this group are to be included in the Paired endpoints list) in broadcast (optionally to the EPP 242, the reserved endpoint for the ZGP Proxy cluster).

Legacy devices do not understand this command and hence ignore it.
 Each ZGP capable device receiving this command
  Stores the information for forwarding
   Creates a Proxy Table entry for SrcID and fills it using the information from the ZGP Configure Pairing command
   Stores the information required for forwarding translated ZGPD commands to legacy devices
    This can have a form of a virtual end point (vEP) with a Command translation table for legacy devices;
   And/or using the Proxy Table, with one of the now reserved sub-fields of the Options field of the Proxy Table entry, for storing LegacyForwarding;
   Alternatively, the Sink Table and/or the Translation Table can be used
  Adds itself (EPP) as a member to the ZGP group (0xBBBB) (by issuing APSME-ADD-GROUP.request)

Steps 11 and 12 are the same as in the first embodiment.

The operational mode will now be described in connection with FIG. 1.

Let's assume the following: device 1 is a ZGP-capable device, device 4 is a ZGP-capable device under control of the ZGPD device and belonging to group 0xBBBB, device 5 is a non-ZGP capable device under control of the ZGPD device and belonging to group 0xAAAA, and devices 1 and 2 are devices not under control of the ZGPD device.

In the operational phase, ZGPD commands are forwarded in translated form to group 0xAAAA, and are tunneled as ZGP commands to group 0xBBBB, according to the following procedure:

Upon reception of a ZGPD command frame from a ZGPD device, device 1:
 translates the command and forwarding the translated command to devices members of group 0xAAAA, thus to device 5, and
 tunnels the non-translated command to devices members of the second of group 0xBBBB, thus do device 4.

The described embodiments of the invention have been optimized for the specific case of ZigBee Smart Light (ZSL) lamps, both ZGP-capable and non-ZGP-capable, controlled by a remote control and a ZGPD energy-harvesting switch. However, the invention also cover other embodiments, for other applications and device types than lighting, e.g. ZigBee Building Automation and ZigBee Home Automation networks containing both ZGP-capable and non-ZGP-capable devices, to be controlled by a ZGPD, including but not limited to Heating, Ventilation and Air Conditioning (HVAC) devices, security and access control devices (e.g. door/window controllers, etc.), safety devices, other automation devices (e.g. blinds and closures controllers), etc.

The present invention can be used for controlling systems using ZigBee Green Power devices according to the ZigBee Green Power specification [1] (such as energy-harvesting electro-mechanical light switches, solar-powered sensors, or long-lifetime, battery-powered meters), in which some of the devices in the system to be controlled by the ZGPD do not understand ZGP.

Herein after are several embodiments, described with reference to the first embodiment.

The RC group (referenced to as Group ID 0x0007) can be a group established for a different purpose, e.g. pre-existing group controlled by another device, e.g. the RC performing the commissioning operation, or a location-dependent group (e.g. per-room). It can also be a temporary helper group. Or a dedicated fixed reserved GroupID for commissioning purposes. The membership of group 0x0007 can thus persist or be resolved after the ZGP commissioning action. It can be resolved automatically or on explicit commissioning device action (e.g. remove the group).

In Step 0, according to an embodiment, the group of devices to be controlled by the ZGPD does not pre-exist, and is created during the commissioning process. It is created by using one of the following optional features:

Graphical grouping on a graphical user interface (GUI);
ZigBee device and service discovery in combination with ZigBee Identify mechanism (finding all (active) devices matching cluster(s), putting the nodes with matching clusters one by one in identify mode and selecting/deselecting them)
Default groups based on any criteria (e.g. manufacturer, radio range)
Any out-of-band method (e.g. manual operation of the user on that device)
Automated location/commissioning algorithms
Device position in the building layout, etc.

Anyway, the group is determined in such a way that the devices to be controlled by the ZGPD are in the same group with known group ID at the start of Step 10, i.e., when pairing information is sent to the devices to be controlled by the ZGPD.

The role of the commissioning device can be performed by any other device than the ZGP-enabled ZSL remote control. It can e.g. be performed by a ZGP-enabled commissioning tool or any ZGP-enabled device to be controlled by the ZGPD.

The device performing the role of the commissioning tool uses the ZigBee device and service discovery mechanisms (as described by ZigBee specification) to find out the capabilities of the (relevant) devices.

The relevant devices can for example be identified by out-of-band means, e.g. manual operation of the user, or the ZigBee Identify mechanism, or via some radio-communication criteria, such as limited range, (commissioning) network joining criteria, etc.

The discovery can be performed for all devices in the commissioning network/defined range, or for the relevant devices only.

The discovery can already use the ZGPD device and service capability information available from the ZGPD commissioning phase. The discovery can also be generic, with a subsequent step of functionality matching.

In another embodiment, the selected devices are immediately made members of the ZGPD switch group ID (0xVWXY/0xAAAA/0xBBBB), without using the group ID 0x0007

In yet another embodiment, the device performing the role of the commissioning device may communicate with the devices to be controlled by the ZGPD in different communication modes, inch communicating with each device individually, using unicast communication.

In yet another embodiment, instead of ZGP Configure Pairing, different command with the same effect may be used: ZCL commands for directly writing to ZGP Proxy Table and/or Sink Table, as well as ZGP Pairing command.

In another embodiment, in Step 0 and steps 7 to 10, the ZGPD switch group ID is created proactively, before the ZGPD devices are added to the system. For example, in the case where the ZigBee network is set up in an office environment, an "empty" group ID (i.e. a group not yet controlled by any device) is created for each functionally separate entity, like zone, room, workplace, floor, etc. Subsequently, a simple pushbutton-based proximity- or proxy-based pairing, as described in [1, Sec A.3.9] can be used to pair this proactively established, not yet controlled group to the controlling ZGPD—or any regular ZigBee pairing mechanisms can be used to add a regular ZigBee controlling device.

Step 4: the functionality matching can be instead performed by the devices to be controlled by the ZGPD individually, with an individual indication of success failure.

In another embodiment, in steps 2 to 4: Instead of sending the ZGPD Commissioning GPDF, a very restricted ZGPD may only be capable of sending Data GPDF with Auto-Commissioning bit set to 0b1 [1, Sec. A.1.4.1.2] Then, in step 4, the RC/CT/ZGP-capable device can perform the functionality matching based on the ZGPD CommandID sent by the ZGPD. The behavior of the RC-CT/ZGP-capable received when the functionality matching fails is application specific. The commissioning of this ZGPD may be abandoned. Or, the appropriate command translation between the actually sent ZGPD CommandIDs and the expected application actions can be provided.

In another embodiment, in steps 7 and 8: the previous group and alias identifiers, if any, used in relation with the ZGPD switch, are either re-used or replaced by new identifiers.

In yet another embodiment, in Step 11, a translation for some ZGP commands may not be sent, for example since the legacy devices miss the corresponding functionality. If such a command is sent by the ZGPD in the operational phase, legacy devices will not act upon it.

Further/alternative mechanisms (e.g. commands, flags) can be defined to allow for explicit enabling/disabling of both ZGP and legacy forwarding (of tunneled/translated ZGPD commands, respectively).

In a commercial environment, like a building automation system for offices, shops, schools, hospitality, industry and institutions, the use of a commissioning tool is not uncommon. There are also home automation systems using such. The tool can be graphical or just text based, advanced or simple. An exemplary embodiment will now be described, indended for use with a commissioning tool in ZigBee Home Automation/ZigBee Building Automation system.

Step 1. The user puts the commissioning tool in commissioning mode.

Step 2. The user executes the required ZGP commissioning action (as defined in the ZigBee Green Power specification [1]) or set of actions on the ZGPD, until a commissioning success indication is provided by the commissioning tool. The commissioning success indication can be e.g. the icon and/or ZGPD SrcID and/or other identifier of the ZGPD device appearing of the commissioning tool's screen.

The commissioning tool executes the required ZGP commissioning action(s) (as defined in the Green Power specification [1]) and provides commissioning success indication when it's finished. (From this time on, the ZGPD switch can be put back in operational mode).

Based on information from the ZGPD commissioning phase, the commissioning tool performs the application functionality mapping of the ZGPD to the default regular ZigBee functionality.

Step 3. Regular ZigBee devices join the commissioning tool.

The order of steps 2&3 is not strictly prescribed.

Step 4. The user uses the ZigBee Identify mechanism to select a device to be controlled by the ZGPD.

Step 5. For the identified device to be controlled by the ZGPD, the commissioning tool uses the ZigBee device and service discovery mechanisms (as described by ZigBee specification) to find out the capabilities of the joined devices.

Step 6. The commissioning tool performs functionality matching between ZGPD and the identified device. If no default mapping is available, it allows for defining of the translation.

The translation definition phase could e.g. be realised as drop-down menu, consisting of the ZigBee-controllable functionality (ZigBee attributes/commands) available on the identified device.

Step 7. The commissioning tool sends

If the identified device is a non-ZGP capable device:
    ZigBee ZCL Groups Cluster Add Group command for the appropriate GroupID and appropriate endpoint(s) of this device;

If the identified device is a ZGP capable device:
    ZigBee ZCL Groups Cluster Add Group command for the appropriate group and endpoint(s) of this device,
    ZCL Write attributes command for the Sink Table of the ZGP endpoint of this device.

The commissioning tool may explicitly enable/disable ZGP and/or legacy forwarding (of tunneled/translated ZGPD commands, respectively).

Steps 4-7 are to be repeated for all devices to be controlled by the ZGPD.

Step 7 can be performed for each device individually (preferably in unicast), or can be performed jointly with step 8 (below), after the group configuration is finished. This could simplify fixing of e.g. functionality/translation inconsistencies at the commissioning tool, etc.

Step 8. After the commissioning of the group is finished, the commissioning tool can explicitly configure ZGP and/or legacy forwarding, by addressing further, not-to-be-controlled-by-the-ZGPD, ZGP Proxy/Combo devices.

Preferably, the commissioning tool will send unicast ZigBee ZCL Write command for the ZGP Proxy Table attribute or unicast ZGP Pairing command, groupcast/broadcast ZGP Pairing or ZGP Configure Pairing commands, as described in the previous embodiments, can also be used. The commissioning tool will further configure the group membership of those device, is required.

Step 9. Instruct the devices on the commissioning network to switch to operational network.

Step 9 can be performed before step 7&8, i.e. the ZGPD control configuration can be delivered on the operational network.

For step 9 to be performed with success, delivery of ZigBee operational network parameters is required, as defined in the ZigBee specification. This is not specific to this procedure, and can be performed anywhere within/between step 3 and 9.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of communication network and which may be used instead of or in addition to features already described herein.

The invention claimed is:

1. Method for operating devices in a ZigBee network comprising a plurality of ZigBee Green Power (ZGP)-capable devices and a plurality of non-ZGP-capable devices, both under control of at least one ZGP device (ZGPD device), the method comprising the following steps:
the ZGPD device transmitting a ZGPD command frame, upon reception of the ZGPD command frame from the ZGPD device, at least one ZGP-capable device of said plurality of ZGP-capable devices:
    translating a received ZGPD command in said frame to a regular ZigBee command compatible with the non-ZGP-capable devices, and forwarding the regular ZigBee command to at least one non-ZGP-capable device of the plurality of non-ZGP-capable devices, and
    tunneling the ZGPD command using a ZGP tunneling mechanism,
the at least one ZGP-capable device executing only the tunneled command,
the at least one non-ZGP-capable device executing only the regular ZigBee command.

2. Method according to claim 1, further comprising: a commissioning device identifying the plurality of ZGP-capable devices and the plurality of non-ZGP capable devices for control by the ZGPD device the commissioning device generating a first ZigBee group ID and instructing all of the identified devices to become members of a first ZGPD group corresponding to the first ZigBee group ID; all of the identified devices becoming members of first ZGPD group corresponding to the first ZigBee group ID the commissioning device obtaining information about the ZGPD device, comprising a ZGPD SrcID.

3. Method according to claim 2, comprising a pairing step, wherein pairing commands are sent from the commissioning device to the members of the first ZGPD group.

4. Method according to claim 3, wherein all devices under control of the ZGPD device are members of a single ZigBee group,
wherein the forwarding comprises forwarding the regular ZigBee command to members of said ZigBee group,
wherein the tunneling comprises tunneling the ZGPD command to members of the ZigBee group, and wherein the ZGP-capable devices of said ZigBee group, on reception of the regular ZigBee ZGPD command sent to the ZigBee group, silently drop the regular ZigBee command.

5. Method according to claim 4, further the steps of:
for any given ZGP-capable device being a member of the first ZGPD group, having at least one non-ZGP-capable application endpoint being a member of the ZGPD group, upon reception of the pairing commands,
adding a ZGP endpoint of the given ZGP-capable device to the first ZGPD group,
creating a ZGP Sink Table entry for the SrcID,
storing numbers identifying non-ZGP endpoints as being members of the first ZGPD group in a ZGP Command Translation Table of the given ZGP-capable device,
and removing the non-ZGP endpoints from the first ZGPD group.

6. Method according to claim 1, wherein each device under control of the ZGPD device is a member of one of two ZGPD groups consisting of a first group and a second group, the first group comprising a set of the plurality of ZGP-capable devices and the second group comprising a set of the plurality of non-ZGP-capable devices
wherein the forwarding comprises forwarding the regular ZigBee command to devices of the second group and the tunneling comprises tunneling the ZGPD command to device members of the first group.

7. Method according to claim 6, further comprising the step of generating a second ZigBee group ID, wherein the devices of the second group correspond to the second ZigBee group ID.

8. Method according to claim 6, wherein the devices assigned to the first group are devices identified by a commissioning device as being ZGP capable in an identifying step.

9. Method according to claim 6, comprising
for any given ZGP-capable device being a member of the first group, having at least one non-ZGP-capable application endpoint being a member of the first ZGPD group,
adding a ZGP endpoint to the second group,
creating a ZGP Sink Table entry for a SrcID,
storing numbers identifying non-ZGP endpoints as being members of the first group in a ZGP Command Translation Table,
removing the non-ZGP endpoints from the first group, and
for a user, setting the commissioning device in a commissioning mode and/or performing a commissioning action on the ZGPD device.

10. Method according to claim 9, comprising the step of removing any previous group membership of any device in the network related to the ZGPD device.

11. Method according to claim 10, comprising of the following steps:
the step of the commissioning device performing an application functionality matching between the ZGPD device and the plurality of ZGP-capable devices and between the ZGPD device and the plurality of non-ZGP-capable devices,
the step of the commissioning device sending a command to configure the translation of ZGPD command into the regular ZigBee command compatible with the plurality of non-ZGP-capable devices for translation for non-ZGP-capable devices of the plurality of non-ZGP-capable devices in the operational phase, and
the step, for at least one ZGP-capable device of the plurality of ZGP-capable devices with ZGP proxy capabilities, of locally storing translation for the ZGPD command into the regular ZigBee command and information on a group ID to which the regular Zigbee command is forwarded,
wherein the forwarding of the regular ZigBee command uses a ZGP aliasing mechanism.

12. Method according to claim 11, where the commissioning device is a device selected from the group consisting of: a dedicated ZigBee Commissioning Tool device, any ZGP-capable device, a regular remote control device, having also ZGP capabilities, a ZigBee PAN Coordinator, a ZigBee Network Manager, a ZigBee Trust Center, an application software on a device behind a ZigBee bridge or gateway.

13. Method according to claim 12 wherein the identifying step is performed by using at least one of: graphical grouping of any one or more of the plurality of the ZGP-capable devices and/or any one or more of the plurality of non-ZGP-capable devices; a ZigBee device and service discovery method; ZigBee identification of devices matching clusters; default groups based on predetermined criteria; previously established control groups; explicit user action on selected devices; or an out-of-band method.

14. Method according to claim 1, wherein the at least one ZGP-capable device comprises a first actuator configured to actuate a first appliance independently of a second appliance, which is different from the first appliance, and wherein the at least one non-ZGP-capable device comprises a second actuator configured to actuate the second appliance, wherein the first and second appliances, when actuated, alter environmental conditions of an environment in which the first and second appliances are disposed.

15. Method according to claim 1, wherein the at least one ZGP-capable device comprises a first actuator configured to actuate a first lamp independently of a second lamp, which is different from the first lamp, and wherein the at least one non-ZGP-capable device comprises a second actuator configured to actuate the second lamp.

16. A system for operating devices in a ZigBee network comprising a plurality of ZigBee Green Power (ZGP)-capable devices and a plurality of non-ZGP-capable devices, the system comprising:
at least one ZigBee Green Power Device (ZGPD) switch configured to control the plurality of ZGP capable devices and the plurality of non-ZGP-capable devices and configured to transmit a ZGPD command frame;
at least one ZGP-capable device of the plurality of ZGP-capable devices configured to, upon reception of the ZGPD command frame from the ZGPD switch,
translate the received ZGPD command to a regular ZigBee command compatible with the non-ZGP-capable devices;
forward the regular ZigBee command to at least one non-ZGP-capable device of the plurality of non-ZGP-capable devices; and
tunnel the ZGPD command using a ZGP tunneling mechanism, wherein the at least one ZGP-capable device is configured to execute only the tunneled ZGPD command, wherein the at least one non-ZGP capable device is configured to execute only the regular ZigBee the ZGPD command.

17. The system according to claim 16, further comprising a commissioning device configured to:
identify the plurality of ZGP-capable devices and the plurality of non-ZGP-capable devices for control by the at least one ZGPD switch;
generate a first ZigBee group ID and instruct all of the identified devices to become members of a first ZGPD group corresponding to the first ZigBee group ID, wherein all of the identified devices are configured to become members of first ZGPD group corresponding to the first ZigBee group ID; and
obtaining information about the at least one ZGPD switch comprising a ZGPD SrcID.

18. The system according to claim 17, wherein pairing commands are sent from the commissioning device to the members of the first ZGPD group.

19. The system according to claim 18, wherein all devices under control of the at least one ZGPD switch are members of a single ZigBee group, and wherein the at least one ZGP-capable device is configured to forward the regular ZigBee command to the members of said ZigBee group, and is configured to tunnel the ZGPD command to the members of said ZigBee group, and wherein the ZGP-capable devices of said ZigBee group, on reception of the translated ZGPD command sent to the ZigBee group, silently drop the regular ZigBee command.

20. The system according to claim 16, wherein each device under control of the at least one ZGPD switch device is a member of one of two ZGPD groups consisting of a first group and a second group, the first group comprising a set of the plurality of ZGP-capable devices and the second group comprising a set of the plurality of non-ZGP-capable devices wherein the at least one ZGP-capable device is configured to forward the regular ZigBee command to the members of the second group and is configured to tunnel the ZGPD command to the members of the first group.

* * * * *